(12) United States Patent
Kasahara

(10) Patent No.: US 7,872,217 B2
(45) Date of Patent: Jan. 18, 2011

(54) APPARATUS AND METHOD FOR PROJECTION IMAGE HAVING AN IMAGE PROCESSING DEVICE WITH A REPLICA IMAGE INFORMATION GENERATING UNIT

(75) Inventor: Ryosuke Kasahara, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 359 days.

(21) Appl. No.: 12/219,102

(22) Filed: Jul. 16, 2008

(65) Prior Publication Data

US 2009/0040398 A1     Feb. 12, 2009

(30) Foreign Application Priority Data

Aug. 6, 2007  (JP)  ............................... 2007-204596

(51) Int. Cl.
*H01L 27/00* (2006.01)
(52) U.S. Cl. ................... 250/208.1; 250/214 R
(58) Field of Classification Search .............. 250/208.1, 250/214 R, 205; 353/31, 69, 85; 382/165–173, 382/261, 274; 348/759–766; 345/1.1, 1.3, 345/3.3
See application file for complete search history.

(56) References Cited

U.S. PATENT DOCUMENTS 7,128,420 B2 * 10/2006 Kapellner et al. ............. 353/38

FOREIGN PATENT DOCUMENTS

| | | |
|---|---|---|
| EP | 1 475 745 | 11/2004 |
| JP | 3264916 | 12/2001 |
| JP | 3357026 | 10/2002 |
| JP | 2008-131099 | 6/2005 |
| WO | WO 2006/135359 | 12/2006 |

OTHER PUBLICATIONS

Pixel Shift Technology (http://www.ricoh.co.jp/tech/15/15_02.html) printed Sep. 24, 2008 and English abstract thereof.
English Abstract of JP 2008-131099 (Jun. 5, 2008).
Search Report dated Feb. 23, 2009 for corresponding European Application No. 08160886.1.
Will Allen et al.: Wobulation: Doubling the Addressed Resolution of Projection Displays, 47.4, SID 05 DIGET www.hpl.hp.com/personal/Robert_Ulichney/papers/2005-wobulation-SID.pdf.
Abstract of JP 2001-005098 published Jan. 12, 2001.
Abstract of JP 2001-033753 published Feb. 9, 2001.

* cited by examiner

*Primary Examiner*—Que T Le
(74) *Attorney, Agent, or Firm*—Harness, Dickey, & Pierce, P.L.C.

(57) ABSTRACT

When it is estimated that first average brightness of image information of a projection image is under second average brightness of image information of a source image having a single spatial frequency on which a normal compensation is performed, an area having brightness above the second average brightness in the image information of the projection image is increased, and when it is estimated that the first average brightness is above the second average brightness, an area having brightness under the second average brightness in the image information of the projection image is increased.

20 Claims, 11 Drawing Sheets

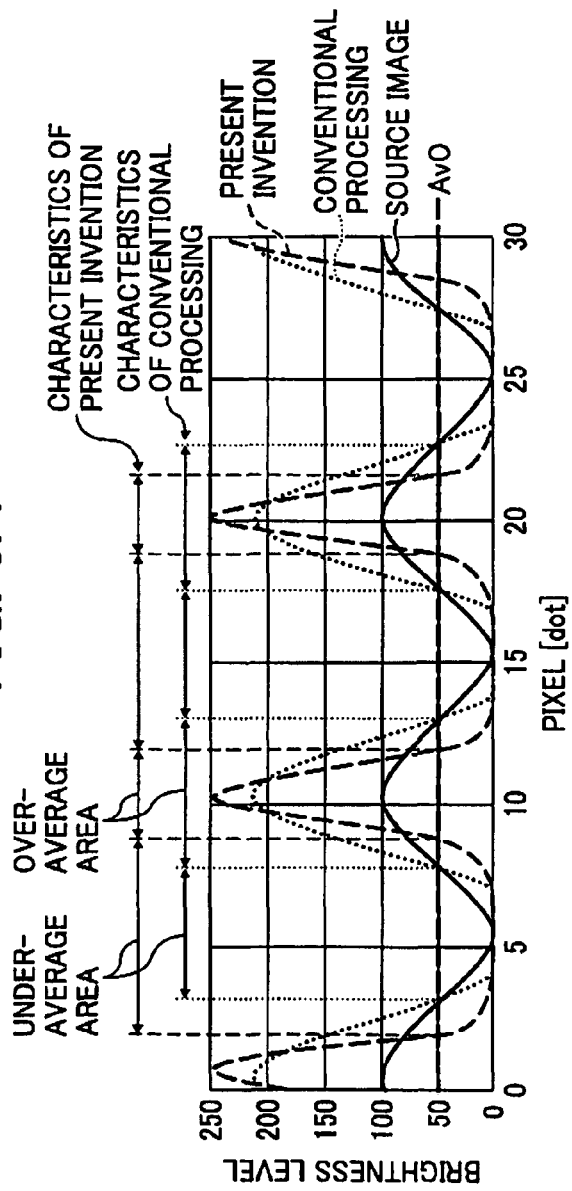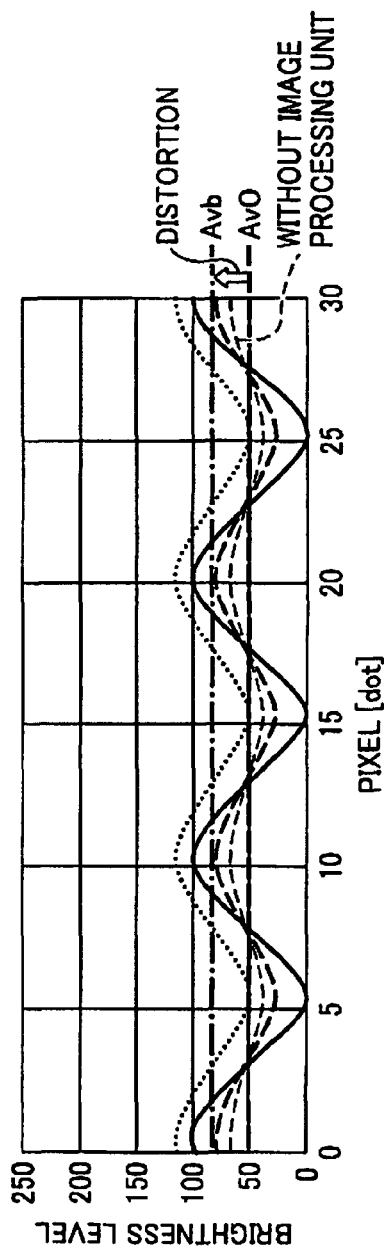

SOURCE IMAGE

INPUT TO SPATIAL LIGHT MODULATOR
(CONVENTIONAL PROCESSING)

INPUT TO SPATIAL LIGHT MODULATOR
(PRESENT INVENTION)

PROJECTED IMAGE
(WITHOUT IMAGE PROCESSING UNIT)

PROJECTED IMAGE
(CONVENTIONAL PROCESSING)

PROJECTED IMAGE
(PRESENT INVENTION)

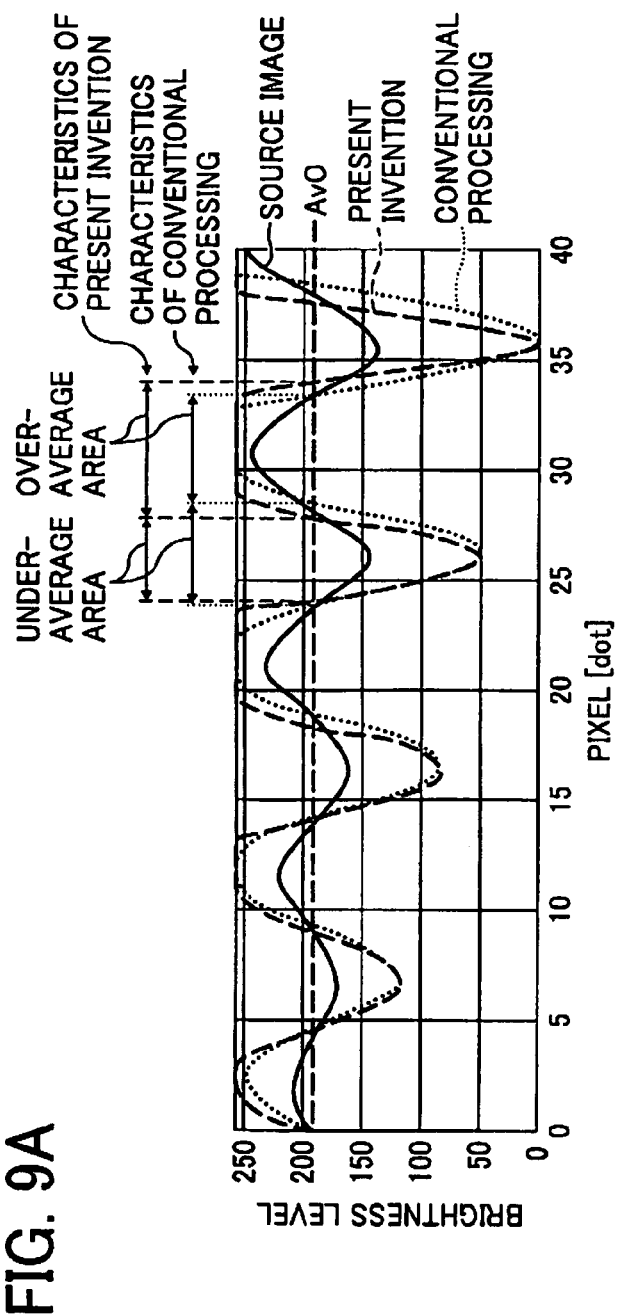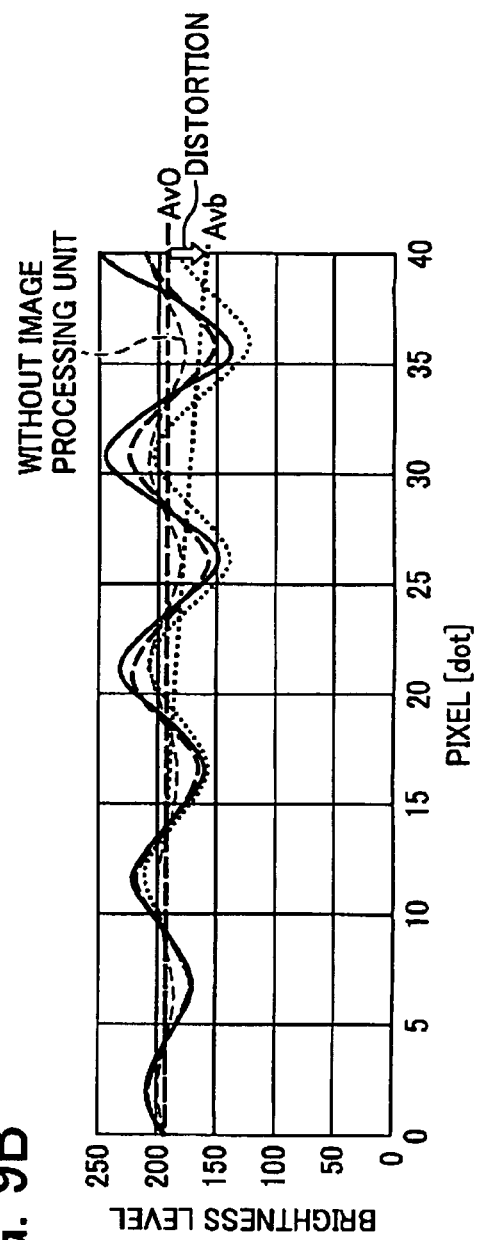
FIG. 9A
FIG. 9B

| | WITHOUT IMAGE PROCESSING UNIT | PROCESSING USING EQUATION (2) | PROCESSING USING EQUATION (4) |
|---|---|---|---|
| IMAGE 1 | | | |
| IMAGE 2 | | | |

APPARATUS AND METHOD FOR PROJECTION IMAGE HAVING AN IMAGE PROCESSING DEVICE WITH A REPLICA IMAGE INFORMATION GENERATING UNIT

CROSS-REFERENCE TO RELATED APPLICATIONS

The present application claims priority to and incorporates by reference the entire contents of Japanese priority document 2007-204596 filed in Japan on Aug. 6, 2007.

BACKGROUND OF THE INVENTION

1. Field of the Invention

The present invention relates to a technology for projecting an image.

2. Description of the Related Art

With development in electronic information media, there are more opportunities to use an image projection apparatus (i.e., a projector) including a lighting optical system including a light source and other optical components, a spatial light modulator (SLM) such as a liquid crystal light modulator that modulates a light beam emitted from the lighting optical system based on image information received from an external device, and a projection optical system such as a projection lens to display an image by projecting the light beam modulated by the SLM as an enlarged image on a screen. Particularly, a liquid crystal projector using a liquid crystal light modulator as the SLM is famous among projectors. The liquid crystal projector is capable of easily adjusting a screen size and excellent in color reproduction, which is widely used as, for example, a projector in a conference room.

With the increasing use of the projector, there is a rapidly increasing demand for simplifying a structure and decreasing a size of the projector. To simplify and downsize the projector, downsizing and weight reduction of the projection lens that constitutes the projection optical system has been a key subject. For downsizing and weight reduction of the projection lens, a reduction in the number of lenses constituting the projection lens is effective. However, the reduction in the number of lenses usually leads to degradation in resolution and imaging performance, such as a distortion aberration, a magnification-chromatic aberration, or astigmatism.

For the aberration in the projection optical system, a method has been proposed in which various types of aberrations occurring in the projection optical system are figured out at the time of designing the projection optical system and the shape and the structure of the SLM are adjusted to compensate in advance the aberrations occurring in the projection optical system, which reduces the aberrations in the image projected on the screen. For example, Japanese Patent No. 3264916 discloses a method in which an effective area of the SLM, on which an image is formed, is changed depending on a wavelength to compensate a chromatic aberration. Furthermore, Japanese Patent No. 3357026 discloses an SLM having a structure that is distorted in shape or curved depending on a distortion or a distortion aberration that is caused by a projection optical system.

As explained above, improvements can be made to some extent for the aberrations in the projection optical system by modifying the shape or the structure of the SLM. However, in these methods, the SLM to be used requires a special structure, and it is difficult to sufficiently compensate the degradation in resolution of the projection optical system.

SUMMARY OF THE INVENTION

It is an object of the present invention to at least partially solve the problems in the conventional technology.

According to an aspect of the present invention, there is provided a method of projecting an image for an image projecting apparatus that includes a lighting optical system that emits a light beam, an image processing device that processes image information of a source image, a spatial light modulator that modulates the light beam based on the image information of the source image, and a projection optical system that projects the light beam modulated by the spatial light modulator on a screen as a projection image. The method includes compensation operating including the image processing device performing a first compensation of highlighting a high frequency range of a spatial frequency component of the image information of the source image and a second compensation of increasing, when it is determined that average brightness of image information of the projection image is under average brightness of the image information of the source image having a single spatial frequency on which the first compensation is performed, an area having brightness above the average brightness of the image information of the source image in the image information of the projection image, and when it is determined that the average brightness of the image information of the projection image is above the average brightness of the image information of the source image, an area having brightness under the average brightness of the image information of the source image in the image information of the projection image.

Furthermore, according to another aspect of the present invention, there is provided an apparatus for projecting an image including a lighting optical system that emits a light beam; an image processing device that processes image information of a source image; a spatial light modulator that modulates the light beam based on the image information of the source image; and a projection optical system that projects the light beam modulated by the spatial light modulator on a screen as a projection image. The image processing device includes a replica image information generating unit that generates replica image information for obtaining the projection image on the screen, a first image information generating unit that generates first image information based on a division of brightness of the image information of the source image and brightness of each pixel of the replica image information, a second image information generating unit that generates second image information based on a convolution integral of brightness of the first image information and a point spread function of the projection optical system, and an output image information generating unit that generates and updates output image information based on a product of brightness of the second image information and brightness of each pixel of the output image information.

Moreover, according to still another aspect of the present invention, there is provided an apparatus for projecting an image including a lighting optical system that emits a light beam; an image processing device that processes source image information; a spatial light modulator that modulates the light beam by spatial modulation based on a result of processing the source image information; and a projection optical system that projects the light beam modulated by the spatial light modulator on a screen as a projection image. The image processing device includes a replica image information generating unit that generates replica image information for obtaining the projection image on the screen, a first image information generating unit that generates first image information based on a division of brightness of the image information of the source image and brightness of each pixel of the replica image information, a second image information generating unit that generates second image information based on a convolution integral of brightness of the first image information and a point spread function of the projection optical system, an output image information generating unit that generates and updates output image information based on a sum of brightness of the second image information and brightness of each pixel of the output image information, and at least one of a maximum limiting unit that adjusts brightness of a pixel of the output image information, which is over a rated maximum value, to the rated maximum value and a minimum limiting unit that adjusts brightness of a pixel of the output image information, which is under a rated minimum value, to the rated minimum value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B are graphs for explaining results of image processing-performed on a sample image;

FIGS. 9A and 9B are graphs for explaining effects of Equation (4);

DETAILED DESCRIPTION OF THE PREFERRED EMBODIMENTS

Exemplary embodiments of the present invention are explained in detail below with reference to the accompanying drawings.

Figure 1:
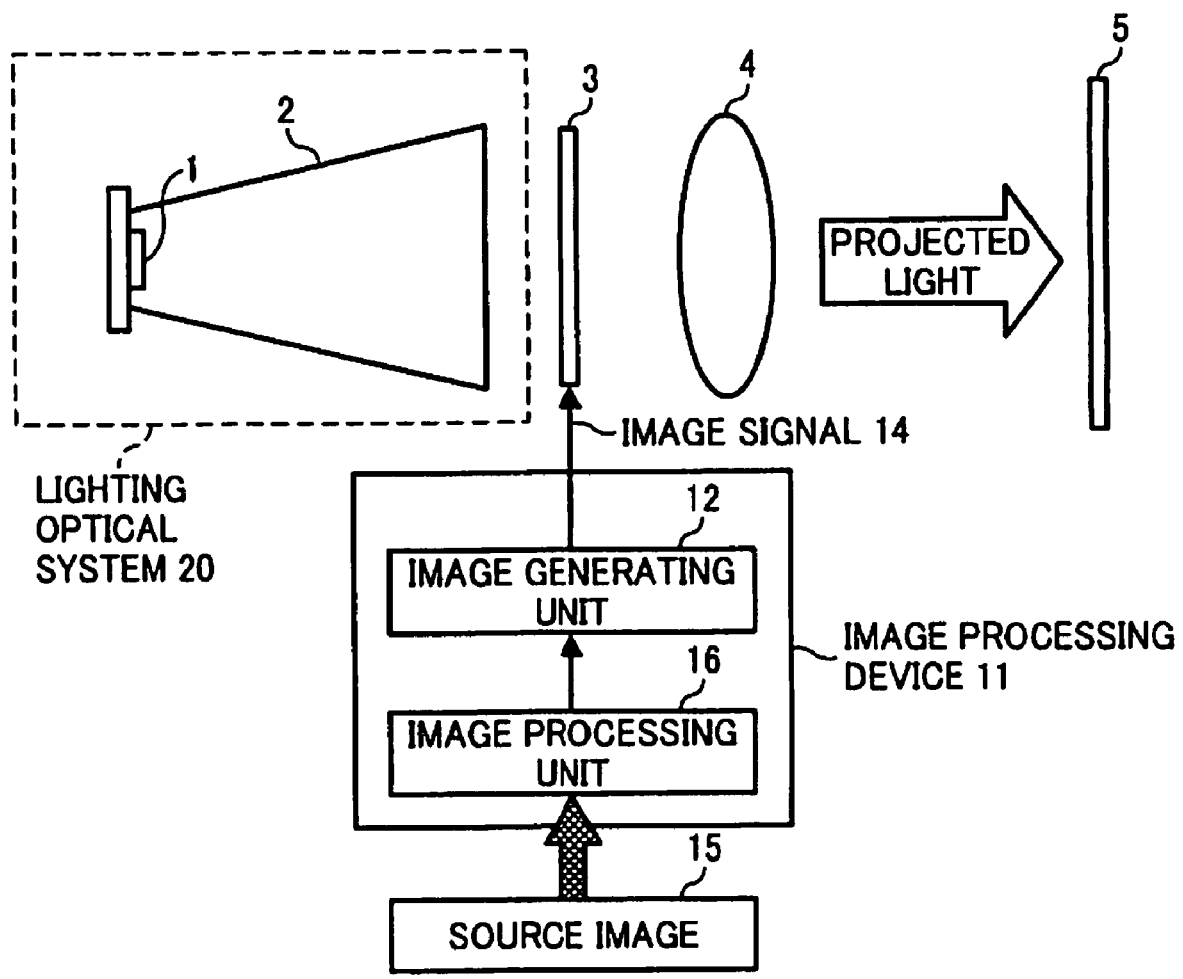
FIG. 1 is a schematic diagram of an image projection apparatus according to an embodiment of the present invention.

FIG. 1 is a schematic diagram of an image projection apparatus (hereinafter, "projector") according to an embodiment of the present invention. The projector includes a light source 1, a rod integrator 2, a spatial light modulator (SLM) 3, a projection optical system 4, a screen 5, an image processing device 11, and a lighting optical system 20.

As shown in FIG. 1, the SLM 3 receives an image signal 14 that is image information on each pixel area from the image processing device 11 that includes an image processing unit 16 and an image generating unit 12. Specifically, the image processing device 11 processes a source image 15 received from an external device and outputs a processed image as the image signal 14.

The light source 1 includes a plurality of light emitting diodes (LEDs) that are arranged in two-dimensional array. To prevent a light leakage, it is preferable that the light source 1 be arranged such that light emitting portions of the LEDs are housed in the rod integrator 2. The LEDs are configured to emit lights simultaneously by a power supply from an external power source (not shown). The LEDs that emit monochromatic lights of primary colors of red (R), green (G), and blue (B) are arranged in a predetermined pattern such that plane white light is obtained when all of the LEDs emits the lights. As explained above, the LEDs are used as the light source 1. Alternatively, light sources utilizing other light emitting principles such as a semiconductor laser device that is a point light source and emits a light consuming a low electric power can be used.

The rod integrator 2 forms a truncated pyramid that is constituted of, for example, four walls and widened toward its end. The inner wall of the rod integrator 2 is a reflective surface. The rod integrator 2 is formed by bonding four mirrors of the same size such that two mirrors in a pair are opposed to each other. Alternatively, four mirrors each of which is obtained by depositing a metal film made of, for example, aluminum, or applying a reflective film with an adhesive, on a resin plate or the like can be bonded to form the rod integrator 2. As for all types of structure, it is preferable that the inner walls of the rod integrator 2 be a smooth mirror surface on which a light can experience a total reflection on the inner walls to reduce the light loss. The light beams guided through the rod integrator 2 are reflected on the surfaces of the inner walls, and a homogeneous light distribution is obtained at an output surface of the rod integrator 2. The configuration of the rod integrator 2 is not limited to the one explained above. A solid transparent material having a light guiding function can be used for the rod integrator 2, and the shape of the rod integrator 2 is not limited to the truncated pyramid, but can be prismatic or cylindrical.

The lighting optical system 20 is constituted of the light source 1 and the rod integrator 2.

As the SLM 3 that performs spatial modulation on a light based on a source image and generates an image, for example, an SLM using a liquid crystal and a digital mirror device (DMD) using a micro mirror array device have been developed. A transmission-type liquid crystal projector has the optical arrangement structure shown in FIG. 1, in which the SLM 3 using the liquid crystal filters a light beam from the light source 1 on a pixel unit area basis and generates an image, and the projection optical system 4 forms the image on the screen 5. The image information on each pixel is sent as the image signal 14 to the SLM 3. When a laser light source is used, a spatial light modulating system in which a small mirror is used to scan a screen with a light beam and image information is generated by modulating the laser light source can be used.

According to the embodiment, degradation of a projection image due to degradation in imaging performance of the projection optical system, which results from a reduction in the number of projection lenses for simplifying the projection optical system, is compensated because the image processing unit 16 processes the image information to be input to the SLM 3. After the image information is processed by the image processing unit 16, the image generating unit 12 converts the image information into a drive signal to be input to the SLM 3 and the image is formed on the SLM 3.

As an example of an image processing method, an inverse filtering process for compensating degradation of a projection image by a projection optical system has been used. For example, an inverse filter for compensating degradation of a modulation transfer function (MTF) that is an index of lens performance for evaluating contrast reproduction is designed, and the image processing unit 16 applies the inverse filter to the source image 15 to generate the image appropriate to the projection optical system 4 and the image is output to the SLM 3. The inverse filter is, for example, the Wiener filter.

The inverse filtering process is a method for compensating degradation of the MTF of the projection image by performing an inverse operation to compensate transformation of the image information due to degradation of the MTF of the projection image, i.e., by performing an inverse transformation processing. With such an image processing method, if the processed image information is within a modulation range, i.e., a dynamic range (DR), in which the image information can be reproduced by the SLM 3, i.e., if the source image is not extremely close to white or black, the source image can be precisely reproduced as the projection image even if the imaging quality of the lens degrades.

The Wiener filter is briefly explained below. The Wiener filter is a linear filter expressed by $$w(x, y) = IFT\left(\frac{[FT\{h(x, y)\}]^*}{|FT\{h(x, y)\}|^2 + c}\right) \quad (1)$$

where FT is two-dimensional Fourier transformation, IFT is two-dimensional Fourier transformation, * is complex conjugate, $w(x, y)$ is inverse filter coefficient, $h(x, y)$ is point spread function (PSF) of the projection optical system 4, c is constant which is set as an appropriate value depending on the amount of deformation due to the amount of saturation explained below. By this calculation, the linear inverse filter, i.e., $w(x, y)$, is designed.

Equation (2) is used to apply the filter $w(x, y)$ to the image.

$$f(x, y) = \text{limit}w[g(x, y)*w(x, y)] \quad (2)$$

where * is convolution integral, $f(x, y)$ is brightness of a filter output image at coordinates $(x, y)$, $g(x, y)$ is brightness of the source image (filter input image), and limitw (A) is function in which A=255 when A>255 and A=0 when A<0. In this case, the maximum value is 255 and the minimum value is 0. However, practically, the maximum value and the minimum value of the DR of the SLM 3 are set.

Figure 2A:
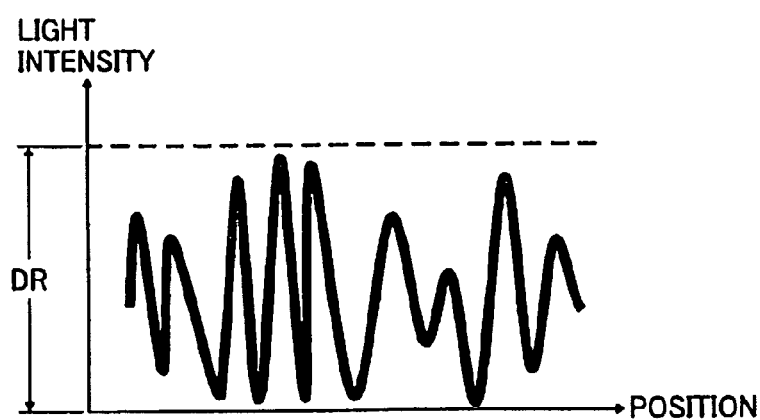
FIGS. 2A to 2C are schematic diagrams for explaining variations in image information, which result from filtering.
Figure 2B:
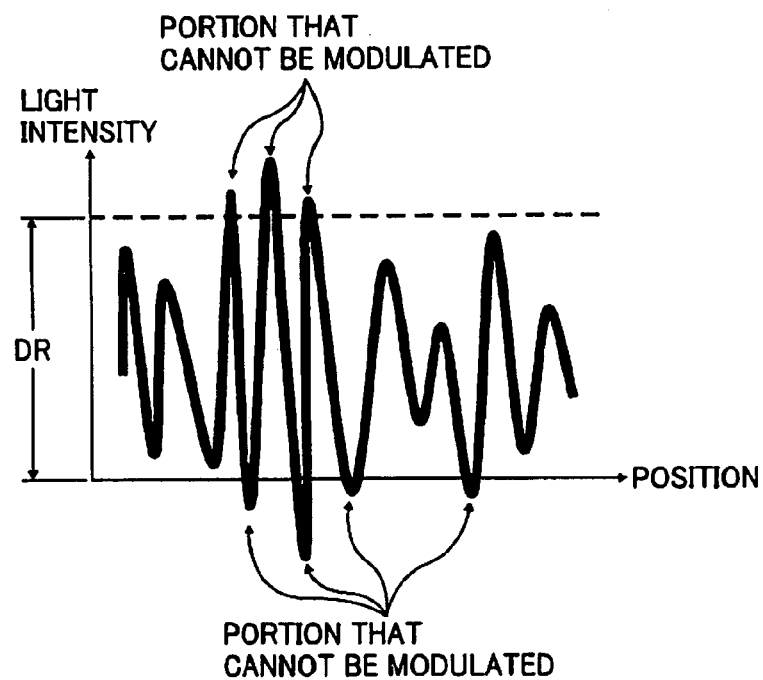
Figure 2C:
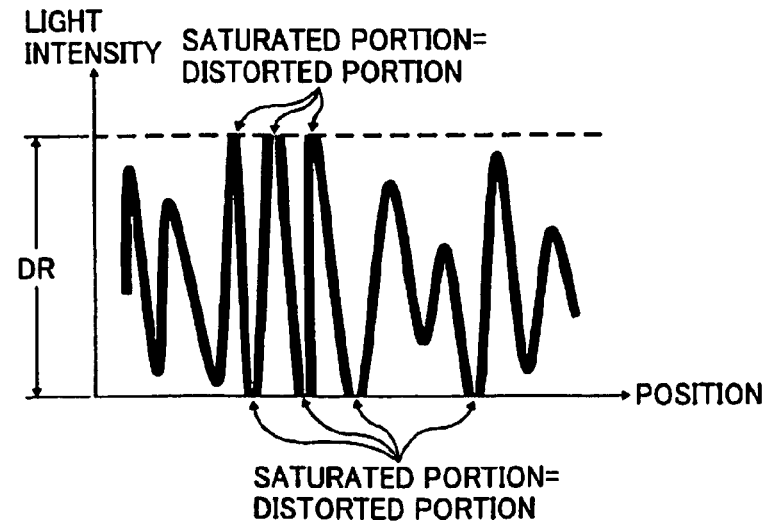

FIGS. 2A to 2C are schematic diagrams for explaining variations in image information, which result from the filtering process. FIG. 2A is a schematic diagram of the image information of the source image, FIG. 2B is a schematic diagram of the image information on which the inverse filtering process has been performed, and FIG. 2C is a schematic diagram of the image information on which saturation processing has been performed.

As for FIGS. 2A to 2C, because each of the brightness information of the source image data and the image signal to be input to the SLM 3 is 8 bits, the minimum value is 0 and the maximum value is 255 in the DR. When the linear inverse filter such as the Wiener filter is used, the following drawbacks are caused.

As shown in FIG. 2B, if the inverse filtering process is performed on the source image that has a large amount of a high frequency component which correspond to a portion (pixel area) close to white or black, the processed image information has a portion (i.e., pixel area) that is out of the range in which the image information can be reproduced by the SLM 3. For this reason, the portion beyond the modulation rang is usually saturated within the modulation range using the maximum value and the minimum value of the modulation range, and the image information saturated as shown in FIG. 2C is sent to the SLM 3 to generate the projection image. However, because this process includes saturation which is a nonlinear process, distortion occurs in the projection image, which leads to a projection image that does not reflect the source image.

FIGS. 3A and 3B are graphs for explaining results of performing the image processing on a sample image as a source image. FIG. 3A is a graph of data of the source image and information to be input to the SLM 3 and FIG. 3B is a graph of the image to be projected and images, on each of which each filtering has been performed, on the screen 5.

Reference symbols AvO and Avb shown in FIGS. 3A and 3B denote average brightness of the source image and average brightness obtained using of a conventional processing, respectively.

FIGS. 4A to 4F are schematic diagrams of images projected as two-dimensional images.

The processing performed by the projector according to the embodiment is explained with reference to FIGS. 3A and 3B. For easier understanding, a part of the cross section of the two-dimensional image is taken and a one-dimensional graph thereof is used for explanation. The results of processing the two-dimensional source image are shown in FIGS. 4A to 4F. As the sample image, an image with predetermined amplitude and spatial frequency is used. Furthermore, the sample image has average brightness under the medium value of the DR of the SLM 3.

Figure 4A:
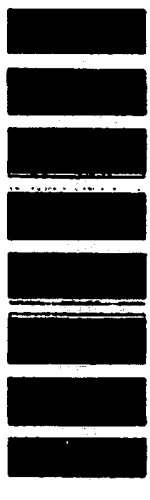
FIGS. 4A to 4F are schematic diagrams of images that are projected as two-dimensional images.
Figure 4B:
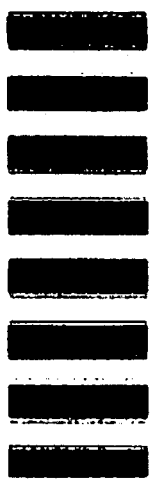
Figure 4C:
Figure 4D:
Figure 4E:
Figure 4F:
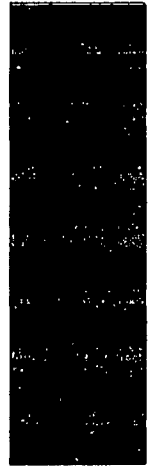

The more the projection image (see FIG. 3B) is close to the source image, the more it is preferable. However, although the amplitude is increased by the conventional processing compared with the case in which the image processing unit 16 is not used, the average brightness is different from that of the source image as shown in FIG. 3B. Furthermore, as shown in FIG. 4E, white portions of the image are more noticeable and the projection image looks different from the source image. Particularly, compared with the case in which the image processing unit 16 is not used, the difference between the projection image and the source image is remarkable, which depicts that the image quality degrades due to the conventional processing, i.e., the distortion explained above.

The image processing unit 16 has first and second compensating functions. The first compensating function is used to highlight a high frequency range of the spatial frequency component of the source image. If the average brightness of each portion of the projection image is under the average brightness of the source image as a result of using the first function, the second compensating function is used, i.e., a compensating operation is performed, to increase the area having brightness above the average brightness of the source image. On the other hand, if the average brightness of the projection image is above the average brightness of the source image as a result of using the first function, the second compensating function is used, i.e., a compensating operation is performed, to increase the area having brightness under the average brightness of the source image. In this example, because the average brightness of the projection image is above that of the source image as a result of highlighting the high frequency range, which is same as that of the conventional processing, by the compensation operation of the first compensating function, the area having brightness under the average brightness of the source image is increased by the second compensating function. Therefore, in the image information to be input to the SLM 3, on which the conventional image processing has been performed, the area having the brightness under the average brightness of the source image is equal to the area having the brightness above the average brightness of the source image. On the other hand, with the process according to the embodiment, the area having the brightness below the average brightness of the original image is increased. As a result, the average brightness of the projection image agrees with that of the source image without distortion. Furthermore, because the high frequency range is highlighted, the image close to the source image can be projected compared with the case in which the image processing unit 16 is not used.

As explained above, because the image generating unit 12 performs the processing according to the embodiment within the constraint of the DR (hereinafter, "DR constraint") of the SLM 3 depending on the average brightness of each portion of the source image instead of the conventional processing, an ideal projection image can be obtained by taking full advantage of the performance of the projection optical system 4 and the SLM 3. The filter according to the embodiment has non-linearity to the input image because of the DR constraint of the SLM 3, and the processing is appropriately performed depending on the image. For this reason, the filter is referred to as "nonlinear adaptive filter".

Figure 5:
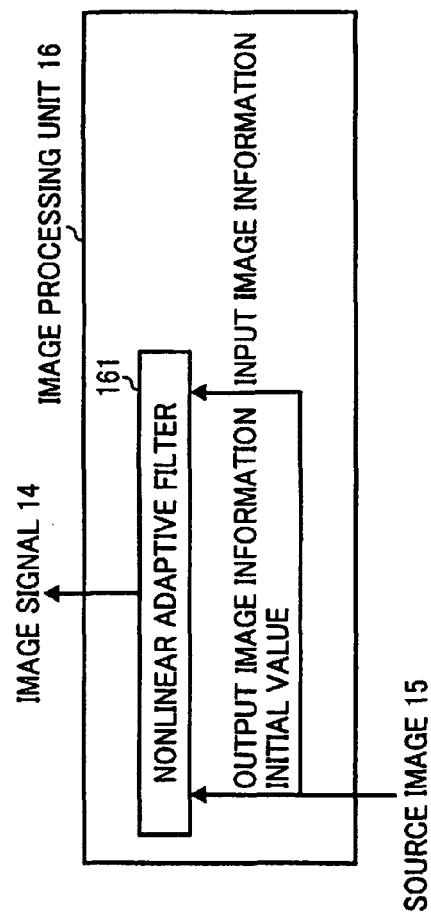
FIG. 5 is a schematic diagram of an image processing apparatus-using a nonlinear adaptive filter.

FIG. 5 is a schematic diagram of the image processing unit 16 using a nonlinear adaptive filter 161. Two examples of the nonlinear adaptive filter 161 are explained in detail below. The first example of the nonlinear adaptive filter 161 is a repetition-update filter that solves Equation (3) that is an update equation. In the nonlinear adaptive filter 161, a replica of the projection image is calculated and the replica is compared with the image to be projected to assume the image to be projected within the DR of the SLM 3 by Bayes' theorem.

$$f_{k+1}(x, y) = \left[ f_k(x, y) \int\int \frac{g(x', y')h(x'-x, y'-y)}{\int\int f_k(x, y)h(x'-x, y'-y)dxdy} dx'dy' \right] \quad (3)$$

where f(x, y) is brightness of the filter output image at coordinates (x, y), g(x, y) is brightness of the source image (filter input image), h(x, y) is point spread function (PSF) of the projection optical system 4, k is index of the number of times of repetition of solving Equation (3), and a part surrounded by the dotted line is filter output image, i.e., convolution integral of an image signal to be input to the SLM 3 and the PSF, i.e., the calculated projection image projected via the projection optical system 4. Hereinafter, the image is referred to as "replica of projection image".

In Equation (3), Bayes' theorem is applied to repeatedly calculate the filter output for obtaining the projection image close to the source image from the replica of the projection image stochastically. Because a negative term is not on the right-hand side of Equation (3), the filter output image from Equation (3) is always larger than zero. In other words, an adaptive inverse filter that satisfies the negative side of the DR constraint of the SLM 3 is constituted.

By adding a function for saturation with the maximum value to Equation (3); Equation (4) is obtained.

$$f_{k+1}(x, y) = \quad (4)$$
$$\text{limit}\left[ f_k(x, y) \int\int \frac{g(x', y')h(x'-x, y'-y)}{\int\int f_k(x, y)h(x'-x, y'-y)dxdy} dx'dy' \right]$$

where limit(A) is function in which A=255 when A>255. In this case, the maximum value is 255. However, practically, the maximum value of the SLM 3 is set. With Equation (4), during repetition of solving Equation (4), both of the negative and positive sides of the DR constraint of the SLM 3 are satisfied. In other words, with the nonlinear adaptive filter 161, the projection image in which the DR constraint of the SLM 3 is added is optimized. When processing a color image, the solving of Equation (4) is performed for each of R, G, and B.

Figure 6:
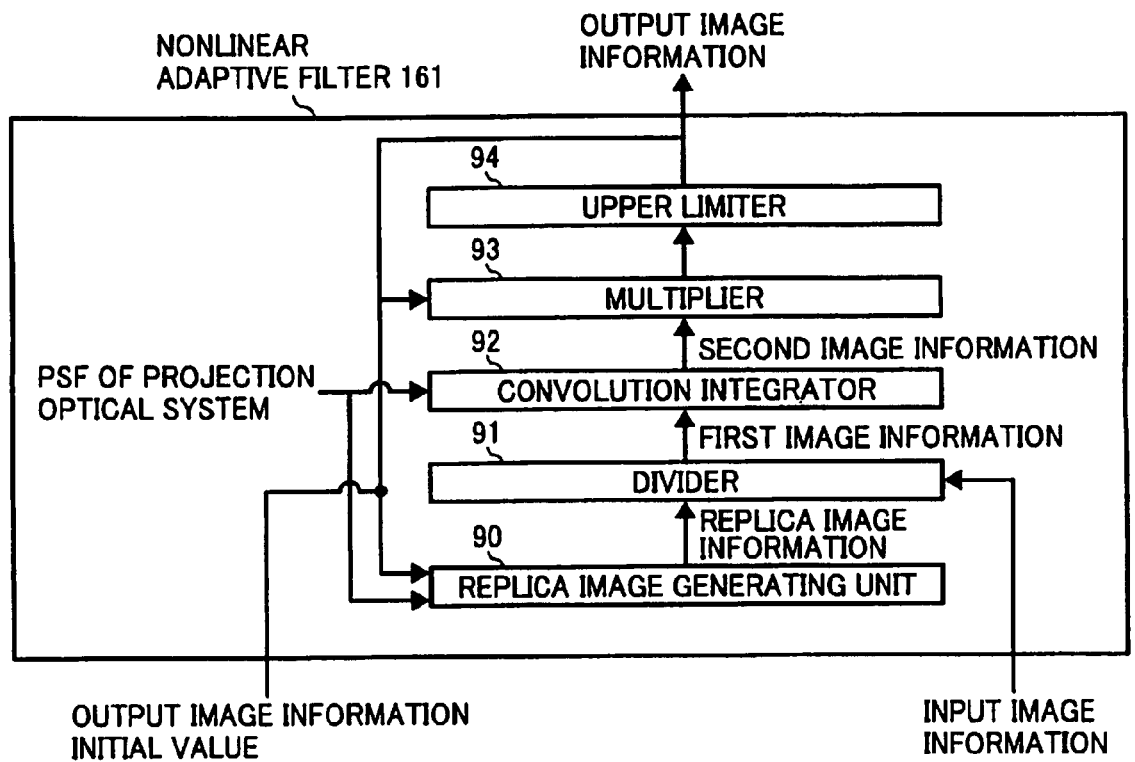
FIG. 6 is a schematic diagram of the nonlinear adaptive filter using Equation (4) of Example 1.

FIG. 6 is a schematic diagram of the nonlinear adaptive filter 161 using Equation (4). The nonlinear adaptive filter 161 includes a replica image generating unit 90 that calculates the denominator on the right-hand side of Equation (4), a divider 91 that performs a division operation using an input that is the numerator, a convolution integrator 92 that performs a convolution integral operation on the result from the divider 91 and the PSF of the projection optical system 4, a multiplier 93 and an upper limiter 94 to perform a multiply operation and saturate the result.

Because a division is on the right-hand side of each of Equations (3) and (4), when these filters are configured as hardware, the use of a lookup table in which the result of division is stored is effective. Specifically, it is effective that the divider 91 includes the lookup table. For example, for 8-bit information, it suffices the lookup table is compatible with combinations of A=0 to 255 and B=0 to 2555 when C=A/B.

Another example of the nonlinear adaptive filter 161 solves Equation (5).

$$f_{k+1}(x, y) = \text{limitw}\left[ \begin{array}{c} f_k(x, y) + k \int\int \{g(x', y') - \\ \int\int f_k(x, y)h(x'-x, y'-y)dxdy\} \\ h(x'-x, y'-y)dx'dy' \end{array} \right] \quad (5)$$

where f(x, y) is brightness of the filter output image at coordinates (x, y), g(x, y) is brightness of the source image (filter input image), h(x, y) is PSF of the projection optical system 4, k is index of the number of times of repeating of solving Equation (5) and is a positive constant, a part surrounded by the dotted line is the filter output image, i.e., convolution integral of the image signal to be input to the SLM 3 and the PSF, i.e., the calculated projection image (i.e., replica of projecting information) projected via the projection optical system 4, limitw(A) is function in which A=255 when A>255 and A=0 when A<0. In this case, the maximum value is 255 and the minimum value is 0. However, practically, the maximum and the minimum values of the SLM 3 are set.

In Equation (5), a difference of the actual source image and the replica of the projection image is obtained, and the filter output image is updated based on a convolution of the difference and the PSF. In Equation (5), during the repetition of solving Equation (5), both of the negative and positive sides of the DR constraint of the SLM 3 are satisfied. In other words, with the nonlinear adaptive filter 161, the projection image in which the DR constraint of the SLM 3 is added is optimized. When processing a color image, the solving of Equation (5) is performed for each of R, G, and B.

Figure 7:
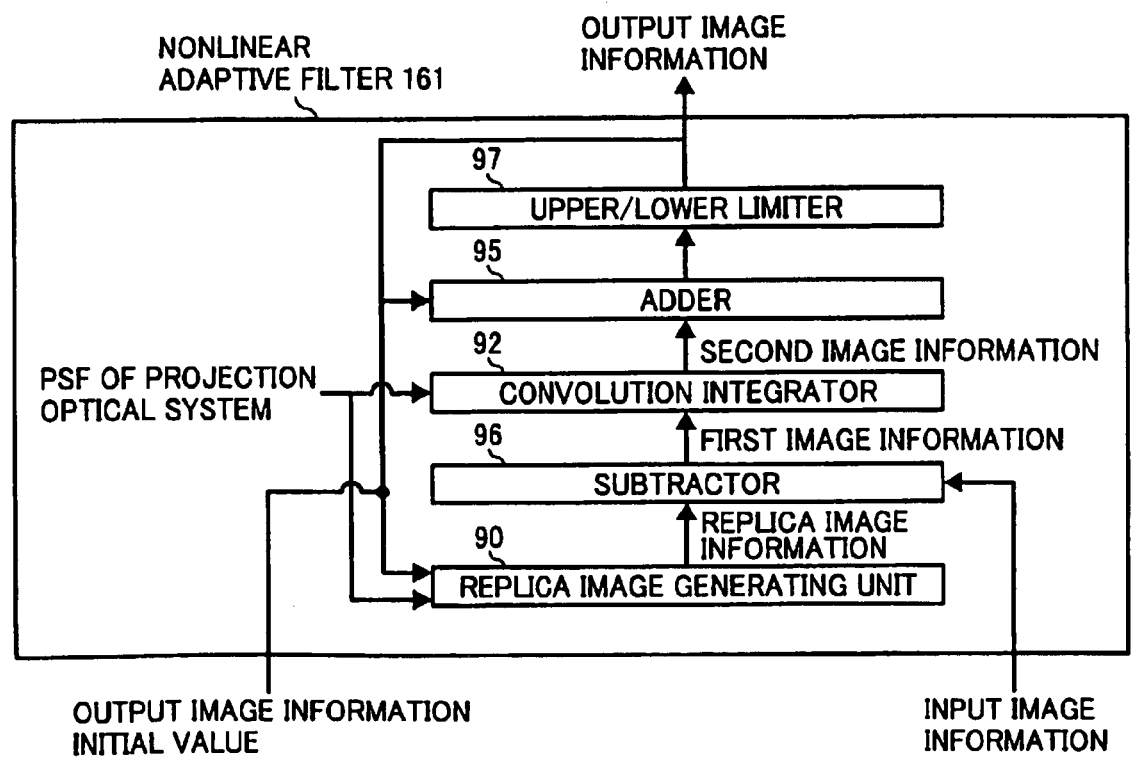
FIG. 7 is a schematic diagram of the nonlinear adaptive filter using Equation (5) of Example 1.
Figure 8:
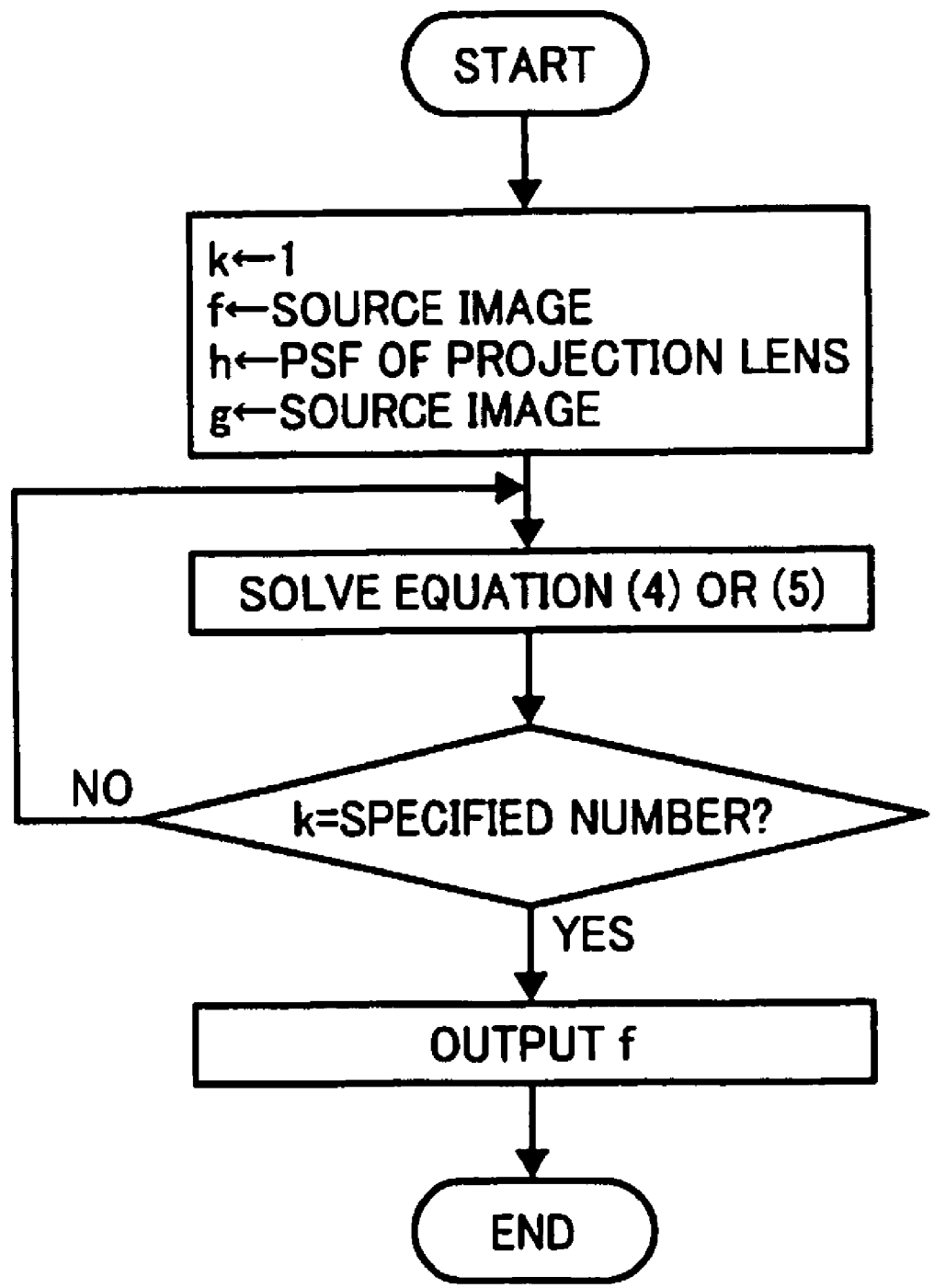
FIG. 8 is a flowchart of processing performed by an image processing unit shown in FIG. 1.

FIG. 7 is a schematic diagram of the nonlinear adaptive filter 161 using Equation (5). FIG. 8 is a flowchart of a process performed by the image processing unit 16. The nonlinear adaptive filter 161 includes the replica image generating unit 90 that calculates the replica of the projection image of Equation (5), a subtractor 96 that performs a subtraction operation using an input, the convolution integrator 92 that performs a convolution integral operation on the result from the subtractor 96 and the PSF of the projection optical system 4, and an adder 95 and an upper/lower limiter 97 to perform performs an add operation and saturate the result.

After values are assigned to the variables shown in FIG. 8, solving of Equation (4) or (5) is repeated for a specified number of times. As a result, the filter result is assigned to f. After f is output, the process is completed. The input image information is used as an initial value of output image information. The sufficient result can be obtained by repeating solving Equation (4) or (5) for about ten times.

Because the imaging performance of the projection optical system 4 degrades largely from the center of the optical axis to the areas therearound, the fineness of the projection image degrades from the center of the optical axis to the areas therearound. By changing h (i.e., PSF) in Equation (5) in different portions as the center portion of the projection image and the areas around the center portion, a loss of fitness of the areas around the center portion can be compensated. Because of the characteristics of the inverse filtering process, a pixel area that is out of the DR in which the image information can be reproduced is easily caused particularly in the area distant from the center of the optical axis. This is because the imaging performance easily degrades in the area distant from the center of the optical axis as the characteristics of the projection optical system 4 and a hard inverse filtering process is necessary for the source image to compensate the degradation. In this case, the process according to the embodiment is highly effective.

In a projector using a zoom optical system that can change the size of a projection image on a screen, a higher quality image can be projected by changing h (i.e., PSF) in association with a zoom position of the projection optical system 4 and a diaphragm size.

A modified example of Equation (4) is expressed by $$f_{k+1}(x, y) = \text{limit}\left[f_k(x, y) \int\int \frac{g(x', y')h(x'-x, y'-y)}{\int\int f_k(x, y)h(x'-x, y'-y)dxdy + c} dx'dy'\right] \quad (6)$$

where c is constant.

Because c is added to the denominator on the right-hand side of Equation (3) or (4), even if the replica of the projection image of the denominator is zero, dividing by zero can be prevented, thereby high quality filtering operation can be performed. It suffices that c is an arbitral small value such as 0.001 or one that can be easily operated.

A modified example of Equation (5) is expressed by $$f_{k+1}(x, y) = \text{limit}w\left[\begin{array}{c} f_k(x, y) + k \int\int \text{fun}\{g(x', y') - \\ \int\int f_k(x, y)h(x'-x, y'-y)dxdy\} \\ \hline h(x'-x, y'-y)dx'dy' \end{array}\right] \quad (7)$$

where fun(x) is function. In Equation (7), after a difference of the replica and the actual source image is obtained, a value obtained using the predetermined function a predetermined function (i.e., fun(x)) is used as an amount of error. fun(x) can satisfy fun(x)=|x|*x where |x| is absolute value of x, or fun(x)=x³. For example, it is known that human eyes have a sense of the log scale to brightness. By adjusting the functions appropriately, an image with the minimum amount of error in consideration of characteristics of human eyes can be obtained.

Furthermore, for example, a conventional method is available that enables projection of an image with a resolution higher than that of the SLM 3 with the time slicing system in which, for example, the SLM 3 fluctuates within a range of a sub-pixel length and the image is displayed on the SLM 3 at an appropriate timing with the timing of the fluctuation. This method is disclosed in, for example, Wobulation: Doubling the Addressed Resolution of Projection Displays, 47.4, SID05 DIGET. (www.hpl.hp.com/personal/Robert_Ulichney/papers/2005-wobulation-SID.pdf.), and Frontiers of Technology: Pxel Shift Technology (http://www.ricoh.co.jp/tech/15/15_02.html).

However, because the size of each original pixel does not vary in this method, even if the SLM 3 is fluctuated within the range of the sub-pixel length, a pixel constituted using sub-pixel shift has a portion where pixels are overlapped, which degrades the resolution (i.e., MTF) inevitably.

If the method according to the embodiment explained above as a method of compensating a degradation component of the projection optical system 4 is applied to the above conventional method, by adding the influence of the overlapping of pixels to the PSF in addition to the degradation by the projection optical system 4, the degradation by the PSF as well as the degradation in resolution by the sub-pixel shift can be compensated.

FIGS. 9A and 9B are graphs for explaining effects of Equation (4) of Example 1. FIG. 9A is a graph of the data of the source image and the information to be input to the SLM 3, and FIG. 9B is a graph of the image to be projected and the images, on each of which each filtering has been performed, on the screen 5. For easier understanding, a part of the cross section of the two-dimensional image is taken and a one-dimensional graph is used for explanation. A sample image in which the amplitude is changed with the constant spatial frequency from the left side of the image to the right side is used. Average brightness of the sample image is above the intermediate value of the DR of the SLM 3. FIG. 9A depicts brightness of the source image and inputs to the SLM 3, on each of which each filtering is performed. FIG. 9B depicts the brightness (an ideal value) of the source image and the brightness of the projection images, on each of which each filtering-is performed, and which is projected on the screen 5 by the projection optical system 4.

As shown in FIG. 9B, both filters function properly and the portion of the image from a halftone portion (from the left side of the graph) to a middle portion is projected with the brightness equal to that of the source image. However, with the processing using the conventional filter (i.e., Equation (2)), a difference (i.e., distortion) between the average brightness of the projection image and that of the source image increases from a portion (i.e., the right portion in the graph) out of the DR of the SLM 3, because the conventional filter saturates the portion having the brightness over the maximum value of the DR of the SLM 3 and the average brightness decreases. This causes not only distortion in the image but also imbalance between colors in a color image, which leads to a color shift. On the other hand, with the processing using the nonlinear adaptive filter 161 (i.e., Equation (4)) according to the embodiment, because the area having the brightness over the average brightness of the original image and the area having the brightness under the average brightness of the original image are adjusted, the average brightness of the projection image does not decrease largely. Furthermore, the processing includes ideal filtering for highlighting the high frequency range within the range, and the projection image the closest to the source image is obtained with Equation (4).

Figure 10A:
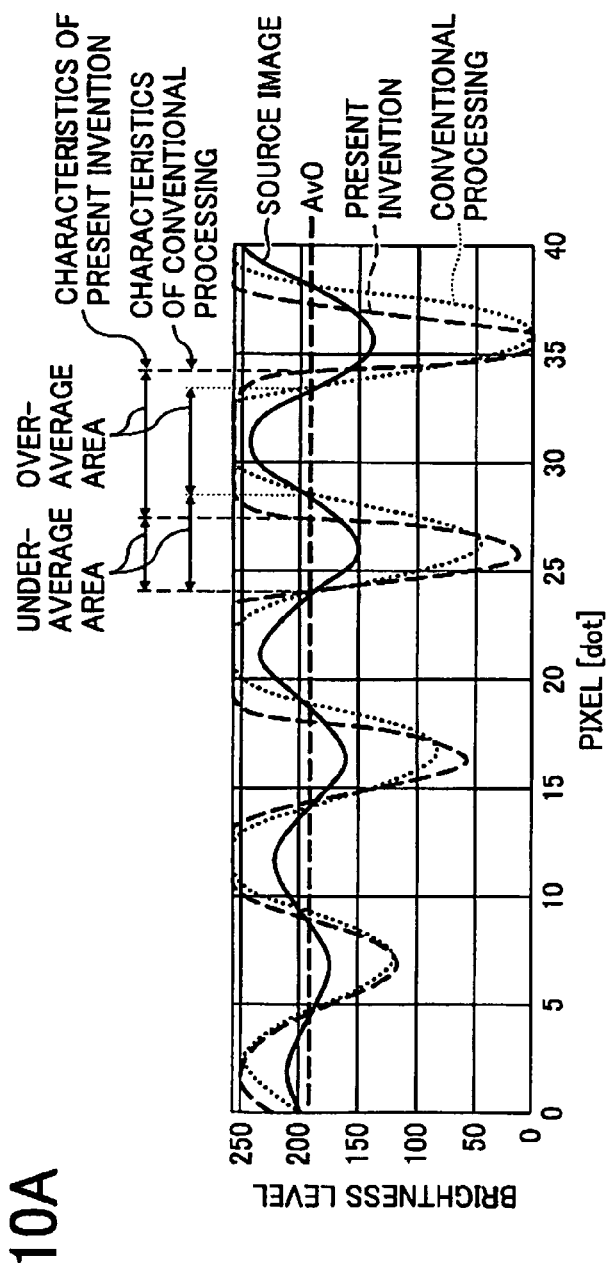
FIGS. 10A and 10B are graphs for explaining effects of Equation (5)
Figure 10B:
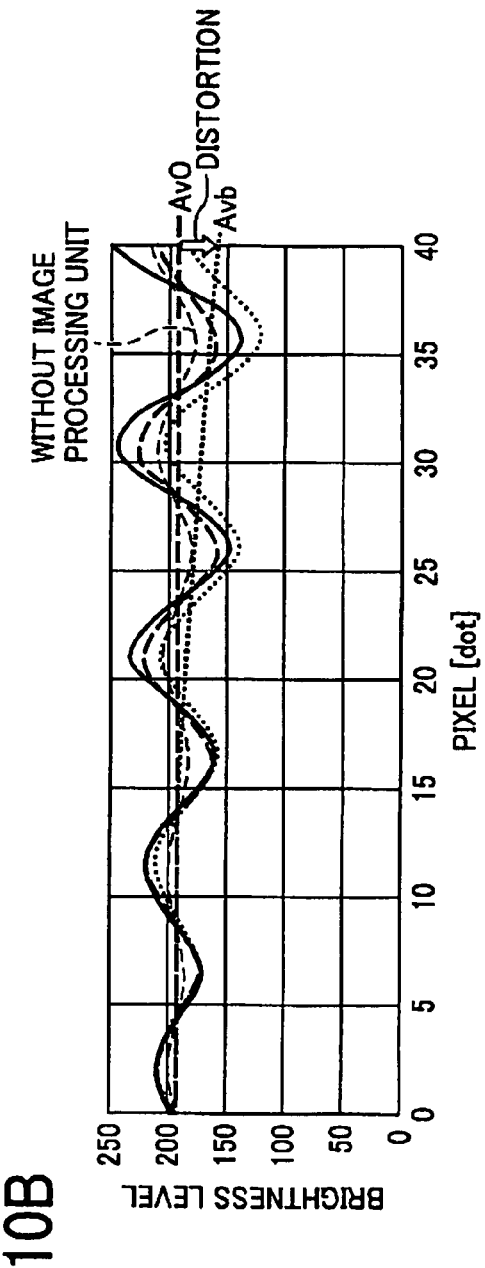

FIGS. 10A and 10B depict that the same effect as that of Equation (4) can be obtained using Equation (5).

Figures 11, 12:
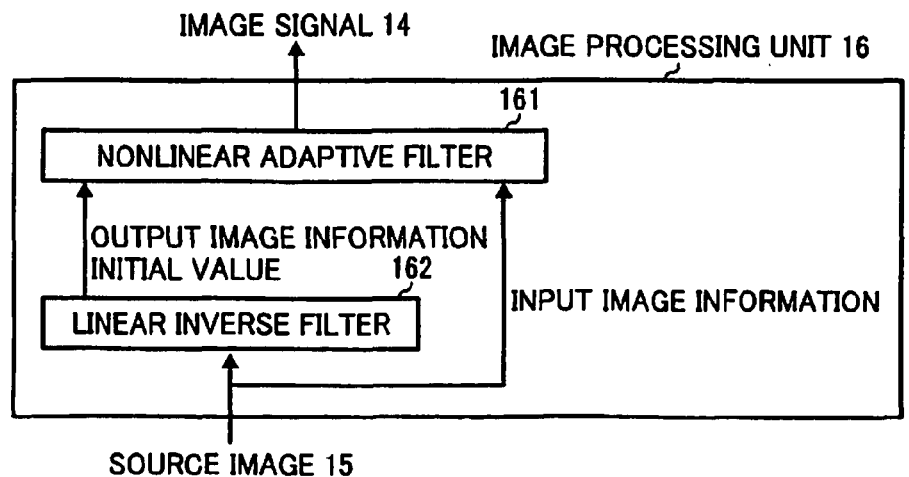
FIG. 11 is a schematic diagram of images that are actually projected on a screen by a projector.
FIG. 12 is a schematic diagram of the image processing unit.

FIG. 11 is a schematic diagram of Images 1 and 2 that are actually projected on the screen 5 by the projector. The difference between the images 1 and 2 is slightly increased to see the difference easily.

Images 1 and 2 shown in FIG. 11 are a picture of a three-dimensional object and a picture of a plane image, respectively. As shown in FIG. 11, the contrast degradation due to the projection optical system 4 is compensated both in the images 1 processed using the conventional filter (i.e., Equation (2)) and the nonlinear adaptive filter 161 (i.e., Equation (4)) and Images 1 are clear compared with Image 1 processed without the image processing unit 16, which is blurred. The same effect can be achieved both with the conventional filter (i.e., Equation (2)) and the nonlinear adaptive filter 161 (i.e., Equation (4)).

However, as shown in FIG. 11, when Image 2 with high contrast is processed with the conventional filter (i.e., Equation (2)), a noise (i.e., linking) occurs around the character of the image. The noise is distortion due to saturation of the portions under and over the maximum and minimum values of the DR of the SLM 3. On the other hand, Image 2 processed with the nonlinear adaptive filter 161 (i.e., Equation (4)) has slightly higher contrast and no distortion compared with.Image 2 processed without the image processing unit 16. In other words, with the nonlinear adaptive filter 161 (i.e., Equation (4)), an ideal processing in which the best use of the DR of the SLM 3 is achieved can be performed.

According to Example 1, because the calculation by the nonlinear adaptive filter 161 is required to be repeated for about 10 times, the larger amount of calculation than that with the conventional liner inverse filter can be a problem from a viewpoint of the circuit size. To reduce the number of repetition of calculation, a structure is effective in which a linear inverse filter using Equation (2) is used as a former circuit and output image information from the linear inverse filter is used as an initial value of the output image information of the nonlinear adaptive filter 161. Because the linear inverse filter using Equation (2) is used first, the number of times to repeat calculation with the nonlinear adaptive filter 161 can be reduced to one to three times, which largely reduces the amount of calculation, i.e., the circuit size.

Figure 13:
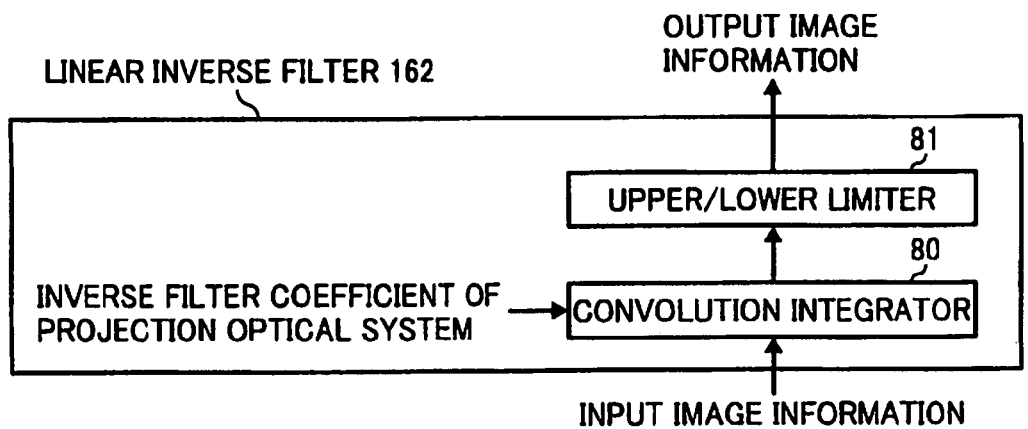
FIG. 13 is a schematic diagram of a linear inverse filter.

FIG. 12 is a schematic diagram of the image processing unit 16 of Example 2. The image processing unit 16 of Example 2 includes the nonlinear adaptive filter 161 using Equation (4) or (5) and a linear inverse filter 162 using Equation (2). The linear inverse filter 162 outputs the initial value of output image information of the nonlinear adaptive filter 161. FIG. 13 is a schematic diagram of the linear inverse filter 162. The linear inverse filter 162 includes a convolution integrator 80 and an upper/lower limiter 81 to solve Equation (2).

Figure 14:
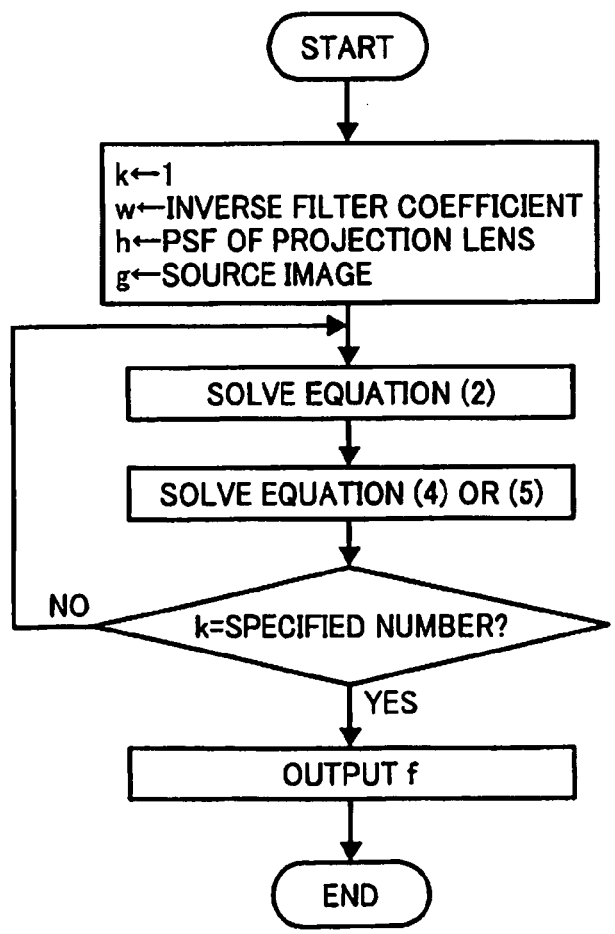
FIG. 14 is a flowchart of processing performed by the image processing unit.

FIG. 14 is a flowchart of the processing performed by the image processing unit 16 shown in FIG. 12. A linear inverse filtering process is performed in which, after values are assigned to the variables shown in FIG. 14, solving Equation (2) is repeated for a specified number of times. As a result, the filter-result is assigned to f. After f is output, the process is completed. In this method, the sufficient result can be obtained by repeating solving Equation (4) or (5) for about two times, which largely reduces the amount of calculation.

To reduce the amount of calculation to process a color image, a method is effective in which the operation with the nonlinear adaptive filter 161 using Equation (4) or (5) is not performed for each of R, G, and B. Specifically, the RGB information is converted to brightness information and contrast information and the nonlinear adaptive filtering using Equation (4) or (5) is performed on only the brightness information and then the RGB information is obtained based on the filtered information by making use of the fact that human eyes are not sensitive to the color information. This method further reduces the amount of calculation to a third of that in the case in which the calculation is performed for each of R, G, and B.

Figure 15:
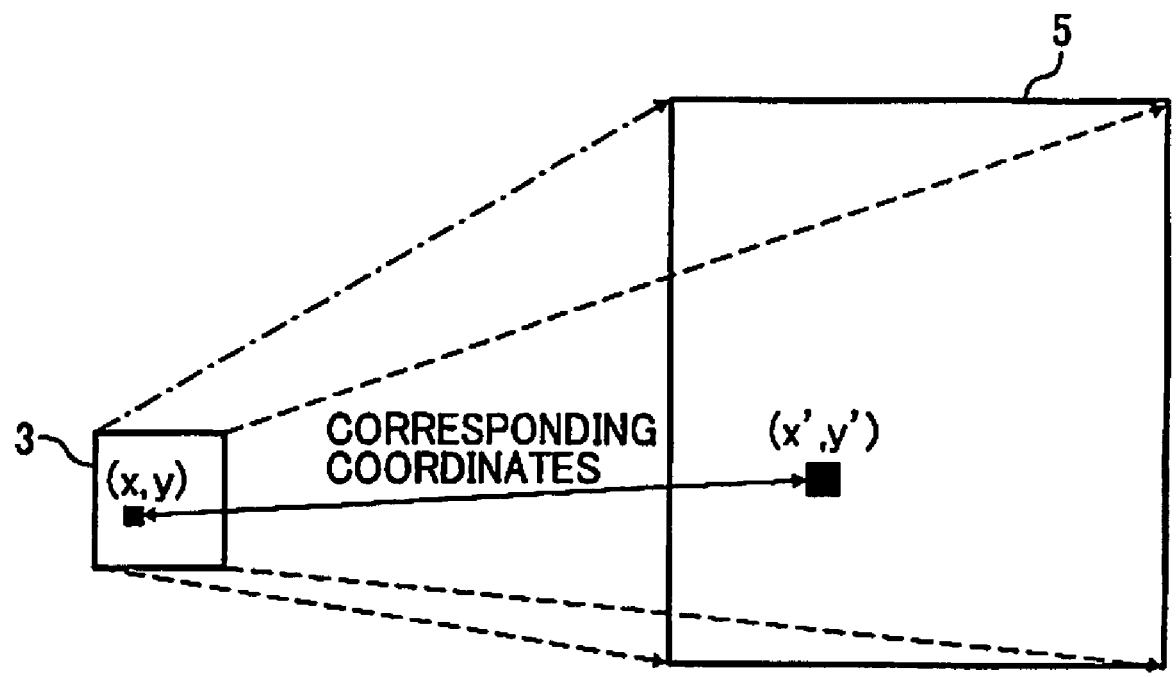
FIG. 15 is a schematic diagram for explaining coordinates of an image and coordinates on the screen, which correspond to those of the image.

FIG. 15 is a schematic diagram for explaining coordinates of an image and those on the screen 5. The term of the replica of the projection image is on the right-hand side of each of Equations (3) to (5). An effect of the screen 5 on which the image is projected can be added to the term of the replica. For example, if the screen 5 has a surface that is not entirely white, i.e., which has a pattern, by multiplying a reflectivity of the screen 5 by the term of the replica, the projection image that cancels the pattern on the screen 5 can be obtained.

Equation (8) that is an improved equation from Equation (4) and achieves the above effect is explained below.

$$f_{k+1}(x, y) = \text{limit}\left[ f_k(x, y) \int \int \frac{g(x', y')h(x'-x, y'-y)}{s(x, y)\int\int f_k(x, y)h(x'-x, y'-y)dxdy} dx'dy' \right] \quad (8)$$

where s(x, y) is reflectivity of the screen 5 at coordinates (x', y').

Equation (9) that is an improved equation from Equation (5) and achieves the above effect is explained below.

$$f_{k+1}(x, y) = \text{limit}w\left[ \begin{array}{l} f_k(x, y) + k\int\int\{g(x', y') - \\ k\int\int f_k(x, y)h(x'-x, y'-y)dxdy\} \\ h(x'-x, y'-y)dx'dy' \end{array} \right] \quad (9)$$

where s(x, y) is reflectivity of the screen 5 at coordinates that corresponds to coordinates on the SLM 3 and (x', y') are coordinates on the screen 5. The image formed on the SLM 3 is projected on the screen 5 by the projection optical system 4. Because (x', y') are coordinates on the screen 5, the coordinates on the SLM 3, which correspond to the coordinates on the screen 5, are determined accordingly.

When the pattern on the screen 5 is a colored pattern, compensation can be made by performing calculation using different reflectivities, i.e., s(x, y), for R, G, and B, respectively.

A camera that takes an image projected by the projector can be arranged on the projector and the image taken by the camera can be analyzed to obtain s(x, y), i.e., the reflectivity of the screen 5.

With this method, an image signal in which the compensation are made for the pattern on the screen 5 and the projection optical system 4 can be obtained by taking full advantage of the DR of the SLM 3. Therefore, the image that accurately reflects the source image can be projected on, for example, a patterned wall or a colored wall.

As described above, according to an aspect of the present invention, a method and apparatus for projecting a high quality image that accurately reflects a source image can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of projecting an image for an image projecting apparatus that includes a lighting optical system that emits a light beam, an image processing device that processes image information of a source image, a spatial light modulator that modulates the light beam based on the image information of the source image, and a projection optical system that projects the light beam modulated by the spatial light modulator on a screen as a projection image, the method comprising:

compensation operating including the image processing device performing a first compensation of highlighting a high frequency range of a spatial frequency component of the image information of the source image and a second compensation of increasing, when it is determined that average brightness of image information of the projection image is under average brightness of the image information of the source image having a single spatial frequency on which the first compensation is performed, an area having brightness above the average brightness of the image information of the source image in the image information of the projection image, and when it is determined that the average brightness of the image information of the projection image is above the average brightness of the image information of the source image, an area having brightness under the average brightness of the image information of the source image in the image information of the projection image.

2. The method according to claim 1, wherein the compensation operating further includes replica image information generating including the image processing device generating replica image information for obtaining the projection image on the screen by the first compensating;

first image information generating including the image processing device generating first image information based on a division of brightness of the image information of the source image and brightness of each pixel of the replica image information;

second image information generating including the image processing device generating second image information based on a convolution integral of brightness of the first image information and a point spread function of the projection optical system; and output image information generating including the image processing device generating and updating output image information based on a product of brightness of the second image information and brightness of each pixel of the output image information.

3. The method according to claim 2, wherein the compensation operating further includes brightness adjusting including the image processing device adjusting brightness of a pixel of the output image information, which is over a rated maximum value, to the rated maximum value.

4. The method according to claim 1, wherein the compensation operating further includes replica image information generating including the image processing device generating replica image information for obtaining the projection image information on the screen by the first compensating;

first image information generating including the image processing device generating first image information based on a division of brightness of each pixel of the replica image information and brightness of the image information of the source image;

second image information generating including the image processing device generating second image information, based on a convolution integral of brightness of the first image information and a point spread function of the projection optical system;

output image information generating including the image processing device generating and updating output image information based on a sum of brightness of the second image information and brightness of each pixel of the output image information; and at least one of first brightness adjusting including the image processing device adjusting brightness of a pixel of the output image information, which is over a rated maximum value, to the rated maximum value and second brightness adjusting including the image processing device adjusting brightness of a pixel of the output image information, which is under a rated minimum value, to the rated minimum value.

5. The method according to claim 2, wherein the compensation operating further includes replica image information generating including the image processing device generating the replica image information based on a convolution integral of brightness of the output image information and the point spread function of the projection optical system.

6. The method according to claim 2, wherein the compensation operating further includes initial value generating including the image processing device generating an initial value of the output image information by a convolution of the image information of the source image and an inverse filter coefficient of the point spread function of the projection optical system before generating the replica image information; and at least one of first brightness adjusting including the image processing device adjusting brightness of a pixel of the initial value of the output image information, which is over a rated maximum value, to the rated maximum value and second brightness adjusting including the image processing device adjusting brightness of a pixel of the initial value of the output image information, which is under a rated minimum value, to the rated minimum value.

7. The method according to claim 2, wherein the compensation operating further includes modified replica image generating including the image processing device generating modified replica image information based on a product of brightness of the replica image information at coordinates on the screen and a reflectivity of the screen at coordinates corresponding to the coordinates of the replica image information.

8. The method according to claim 2, wherein the point spread function is a function that varies depending on the coordinates on the screen.

9. An apparatus for projecting an image, comprising:
a lighting optical system that emits a light beam;
an image processing device that processes image information of a source image;
a spatial light modulator that modulates the light beam based on the image information of the source image; and
a projection optical system that projects the light beam modulated by the spatial light modulator on a screen as a projection image, wherein
the image processing device includes
a replica image information generating unit that generates replica image information for obtaining the projection image on the screen,
a first image information generating unit that generates first image information based on a division of brightness of the image information of the source image and brightness of each pixel of the replica image information,
a second image information generating unit that generates second image information based on a convolution integral of brightness of the first image information and a point spread function of the projection optical system, and
an output image information generating unit that generates and updates output image information based on a product of brightness of the second image information and brightness of each pixel of the output image information.

10. The apparatus according to claim 9, wherein the output image information generating unit includes a maximum limiting unit that adjusts brightness of a pixel of the output image information, which is over a rated maximum value, to the rated maximum value.

11. The apparatus according to claim 9, wherein the replica image information generating unit generates the replica image information based on a convolution integral of brightness of the output image information and the point spread function of the projection optical system.

12. The apparatus according to claim 9, wherein the image processing device further includes
an output image information initial value generating unit that generates an initial value of the output image information by a convolution of the image information of the source image and an inverse filter coefficient of a point spread function of the projection optical system before the replica image information is generated, and
at least one of a maximum limiting unit that adjusts brightness of a pixel of the initial value of the output image information, which is over a rated maximum value, to the rated maximum value and a minimum limiting unit that adjusts brightness of a pixel of the initial value of the output image information, which is under a rated minimum value, to the rated minimum value.

13. The apparatus according to claim 9, wherein the replica image information generating unit generates modified replica image information based on a product of brightness of the replica image information at coordinates on the screen and a reflectivity of the screen at coordinates corresponding to the coordinates of the replica image information.

14. The apparatus according to claim 9, wherein the point spread function is a function that varies depending on the coordinates on the screen.

15. The apparatus according to claim 9, wherein the image processing device further includes a numeric table for performing the division.

16. An apparatus for projecting an image, comprising:
a lighting optical system that emits a light beam;
an image processing device that processes source image information;
a spatial light modulator that modulates the light beam by spatial modulation based on a result of processing the source image information; and
a projection optical system that projects the light beam modulated by the spatial light modulator on a screen as a projection image, wherein
the image processing device includes
a replica image information generating unit that generates replica image information for obtaining the projection image on the screen,
a first image information generating unit that generates first image information based on a division of brightness of the image information of the source image and brightness of each pixel of the replica image information,
a second image information generating unit that generates second image information based on a convolution integral of brightness of the first image information and a point spread function of the projection optical system,
an output image information generating unit that generates and updates output image information based on a sum of brightness of the second image information and brightness of each pixel of the output image information, and
at least one of a maximum limiting unit that adjusts brightness of a pixel of the output image information, which is over a rated maximum value, to the rated maximum value and a minimum limiting unit that adjusts brightness of a pixel of the output image information, which is under a rated minimum value, to the rated minimum value.

17. The apparatus according to claim 16, wherein the replica image information generating unit generates the replica image information based on a convolution integral of brightness of the output image information and the point spread function of the projection optical system.

18. The apparatus according to claim 16, wherein the image processing device further includes
an output image information initial value generating unit that generates an initial value of the output image information by a convolution of the image information of the source image and an inverse filter coefficient of a point spread function of the projection optical system before the replica image information is generated, and
at least one of a maximum limiting unit that adjusts brightness of a pixel of the initial value of the output image information, which is over a rated maximum value, to the rated maximum value and a minimum limiting unit that adjusts brightness of a pixel of the initial value of the output image information, which is under a rated minimum value, to the rated minimum value.

19. The apparatus according to claim 16, wherein the replica image information generating unit generates modified replica image information based on a product of brightness of the replica image information at coordinates on the screen and a reflectivity of the screen at coordinates corresponding to the coordinates of the replica image information.

20. The apparatus according to claim 16, wherein the point spread function is a function that varies depending on the coordinates on the screen.

* * * * *